April 7, 1925.  
H. M. DOWSETT  
1,532,388

WIRELESS TELEGRAPH APPARATUS FOR AEROPLANES

Filed Aug. 16, 1921

Inventor  
H.M. DOWSETT

Patented Apr. 7, 1925.

1,532,388

UNITED STATES PATENT OFFICE.

HARRY MELVILLE DOWSETT, OF LONDON, ENGLAND, ASSIGNOR TO RADIO CORPORATION OF AMERICA, A CORPORATION OF DELAWARE.

WIRELESS-TELEGRAPH APPARATUS FOR AEROPLANES.

Application filed August 16, 1921. Serial No. 492,813.

*To all whom it may concern:*

Be it known that I, HARRY MELVILLE DOWSETT, a British subject, of Marconi House, Strand, London, W. C., England, have made certain new and useful Improvements in Wireless-Telegraph Apparatus for Aeroplanes, (for which I have filed applications as follows: Great Britain, Mar. 2, 1916; Australia, June 15, 1920; Italy, June 8, 1920; France, July 1, 1920; New Zealand, June 22, 1920; Germany, June 4, 1920; Poland, July 8, 1920), of which the following is a specification.

In wireless telegraph working on aeroplanes there is a recognized difficulty that the metal work available to serve as the balancing capacity is limited, especially in the case of monoplanes.

My invention is shown in the drawing herewith in which—

Fig. 1 shows one method of carrying out the invention; and

Fig. 2 a modification thereof.

According to this invention I connect up together the internal bracing wires of the aeroplane wing by arranging between the separate wires, where necessary, conducting joints so as to provide a good path throughout the whole length of the wing, while the connected wires are in turn connected to the wireless transmitter.

I may also increase the electrostatic capacity without increasing the air friction by mounting inside the wings additional wires which are electrically connected to the bracing wires and are supported by lashings through slots in the ribs or by other suitable means. These wires preferably form a grid and may be either bare or insulated, single or multiple strand and are preferably parallel and of equal length.

Where the wires leave the wings, passing through the ribs and framework, and are exposed to the weather, they should be effectually insulated therefrom; but this insulation is less essential inside the wings, though preferable where practicable, for the prevention of loss through leakage.

Figure 1:
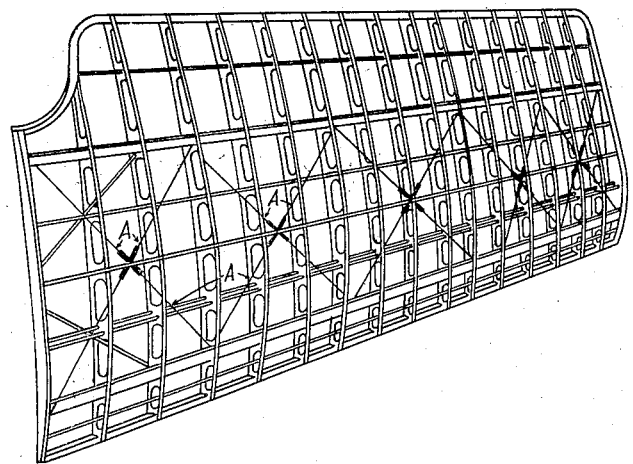
Figure 1 is a perspective view of the frame work of a wing provided with internal bracing wires A which may be either bare or insulated, but in the former case they should not be in contact with the wing fabric. Good conducting joints should be made between the separate wires where necessary so as to provide a good conducting path the whole length of the wing.
Figure 2:
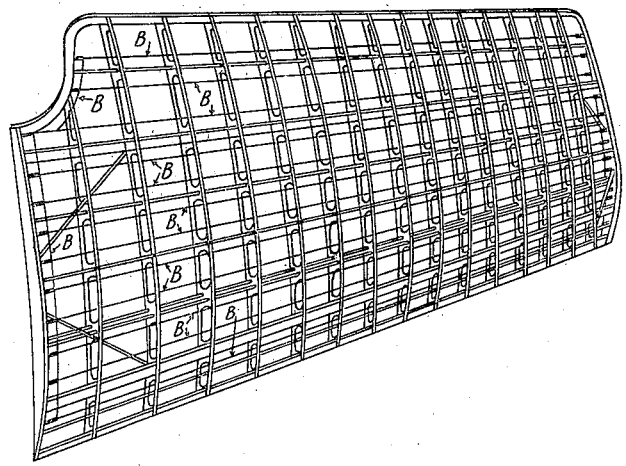
Figure 2 shows a modification having a grid of wires B supported by lashings through slots in the ribs of the wing.

Having described my invention, what I claim is:

1. In radio signalling apparatus for aeroplanes having bracing wires located within the aeroplane wings, the combination with such wires of additional wires disposed within said wings, all of said wires being connected together and to the signalling apparatus.

2. In radio signaling apparatus for aeroplanes in combination an aeroplane wing having internal bracing wires, additional wires located within the wing, substantially parallel to the length of the wing and electrically connected to said bracing wires, and to the signaling apparatus.

HARRY MELVILLE DOWSETT.